Dec. 9, 1947. J. L. BRADFIELD 2,432,224
TUBE CONNECTION
Filed Aug. 6, 1945
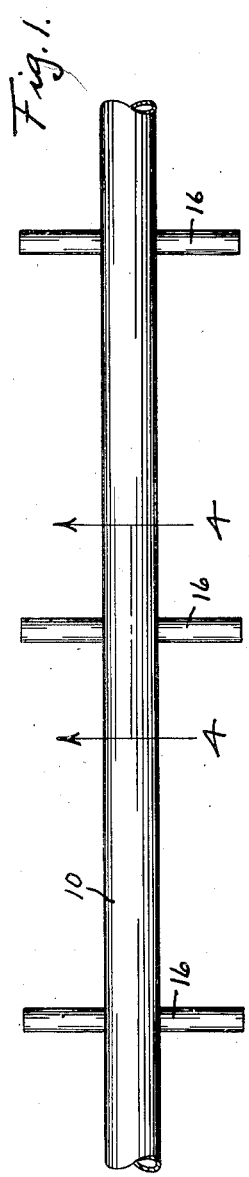
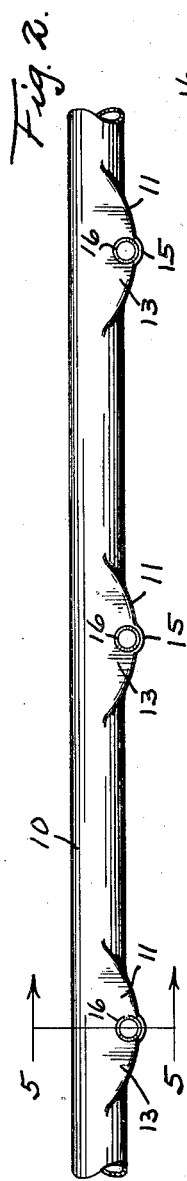
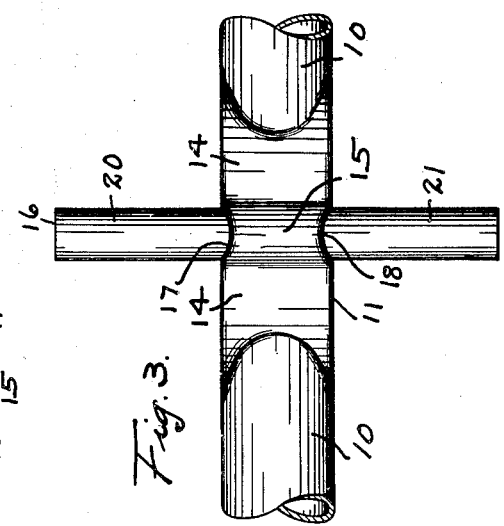
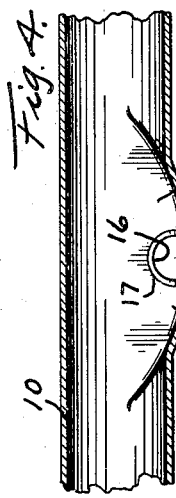
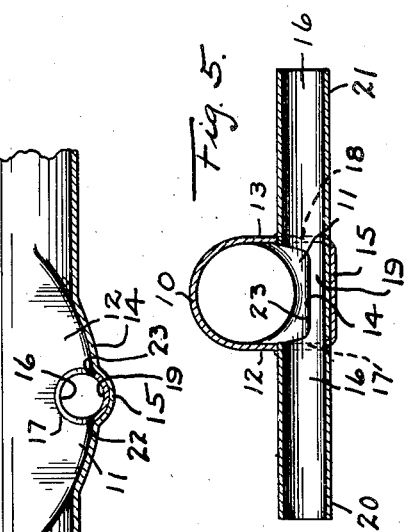
INVENTOR,
JOSEPH L. BRADFIELD,
By Herbert A. Minturn,
ATTORNEY.

Patented Dec. 9, 1947

2,432,224

UNITED STATES PATENT OFFICE 2,432,224

TUBE CONNECTION

Joseph L. Bradfield, Indianapolis, Ind., assignor of twenty-five per cent to Paul Wayne Bradfield, Seattle, Wash., and seventy-five per cent to Herbert A. Minturn, as trustee Application August 6, 1945, Serial No. 609,191

7 Claims. (Cl. 285—105)

This invention relates to lateral flow tubing connections with main supply and return lines particularly adapted for use in radiant heating installations where the lines are embedded and room for cross connections is exceedingly limited.

A primary object of the invention is to provide a connecting structure of the type indicated which may be preformed on suitable main flow line tubes or pipes and supplied to the public ready for connections with the lateral flow lines. Another primary object of the invention is to provide side outlets in a main flow pipe or tube wherein the outlets are disposed out of the main flow channel through the pipe or tube in such manner that a fore bay is formed within the pipe or tube at the entrance to the side connecting tube.

A still further important object of the invention is to provide a mechanical structure wherein the cross connecting tube mechanically passes through the main supply or return tube to be supported thereby in such manner that the cross tube may be welded, brazed, soldered, or the like to the main pipe or tube to leave lengths of the cross tube exposed for connection with the lateral flow lines.

These and many other important objects and advantages of the invention, including the extremely simplified construction with a maximum possible structural strength will become apparent to those versed in the art in the following description of one particular form of the invention as illustrated in the accompanying drawing, in which Fig. 1 is a top plan view of a structure embodying the invention;

Fig. 2, a view in side elevation;

Fig. 3, a bottom plan view on an enlarged scale of a single connection;

Fig. 4, a longitudinal central section on the line 4—4 in Fig. 1, on an enlarged scale; and Fig. 5, a transverse vertical section on the line 5—5 in Fig. 2, also on an enlarged scale.

Like characters of reference indicate like parts throughout the several views in the drawing.

While the invention is not to be limited thereto, it finds an immediate and extremely satisfactory use in radiant heat installations wherein there are flow and return pipes embedded in the ceilings, walls or even floors, particularly in the plaster or cement thereof, and to which pipes are connected lateral flow pipes to provide for circulation of warm water from the flow pipe to the return pipe. The invention is particularly adapted to such use in that the vertical height of the embodiment thereof permits the embedment indicated. Furthermore, the entire installation may be made particularly in the embedded portions without screw or compression fittings, all to the end that leaks are avoided.

Referring to the drawing, a tube 10, which may be either a supply or return line, is preferably made out of a ductile material, such as copper. This tube 10 is formed to have a plurality of under side protruding bays 11, spaced one from the other at the predetermined distances required for the spacing apart of lateral flow lines. In the particular form herein shown, each bay 11 is formed by drawing the copper tube 10 to have substantially parallel walls 12 and 13 with a floor 14 interconnecting the lower ends of those walls to have a generally rectangular section across the floor of the bay. The ends of the floor 14 curve upwardly and merge into the tube 10 as best indicated in Fig. 3.

This formation may be readily produced by providing a suitable die to carry the tube 10 and by forcing a fluid under high pressure in the tube 10 to flow the tube into the cavities provided in the die shaped to define the bays 11, this method being suggested to show the simplicity of the formation without having to employ any complicated methods or systems to produce the structure desired. In any event, as above indicated, the walls forming the bay 11 in each instance are integral parts of the wall of the tube 10. Preferably the floor 14 is arcuate in longitudinal section, Fig. 4, and at the lowermost portion of the floor, the floor is further deformed to provide the arcuate section 15 to have a curvature conforming to the outside diameter of a cross tube 16 which is positioned thereacross by inserting it through holes 17 and 18 bored through the side walls 12 and 13 to slidingly receive the tube 16 therethrough.

The tube 16 is of that length which will provide a length on either side of the tube 10 sufficient for interconnection with a cross flow line (not shown). This tube 16 is cut through across its central portion for at least half its diameter and preferably a little more, Fig. 5, to leave a connecting section 19 between the two outer end portions 20 and 21, Fig. 5. As indicated in Fig. 4, the section 19 has its side upper edges 22 and 23 substantially at the elevation of the upper side of the floor 14 on either side thereof so that any flow down around the floor 14 from either side may be had directly over the edges 22 and 23 without any obstruction thereby.

With the tube 16 positioned to extend through the bay 11 with its cut away portion therewithin positioned as indicated in Figs. 4 and 5, the tube 16 is fixed to the tube 10 by suitable soldering or brazing around the tube at the margin of the openings 17 and 18. This operation may be performed from the outside of the tube 10 providing easy access and quick operation. As may be observed, the cross tube 16 is primarily supported by the arcuate section 15 of the tube 10 so that the function of the brazing about the opening 17 and 18 is primarily to prevent leakage. Of course, the brazing prevents longitudinal displacement of the tube 16. The floor 14 extends downwardly sufficiently in respect to the wall of the tube 10 to position the tube 16 to have its longitudinal axis at least as low as the inside face of the wall of the tube 10. This permits unobstructed flow through the tube 10 and yet by reason of the depressing of the tube 10 to form the bay 11, there is a head or fore bay had which insures an adequate flow of the fluid from the pipe 10 into the cross tube 16 with the minimum resistance thereto. By reason of this construction, a quiet flow of the fluid from the tube 10 into the cross tube 16 may be had to avoid a murmuring or rippling sound which might otherwise be set up.

While I have herein shown and described my invention in the one particular form, it is obvious that structural changes may be employed and different materials may be used, all without departing from the spirit of the invention, and I therefore do not desire to be limited to that precise form beyond the limitations as may be imposed by the following claims.

I claim:

1. For connecting lateral flow pipes with a primary flow pipe, a length of lateral flow pipe; a bay formed in the primary flow pipe having side walls each with an opening therethrough opposite the other of a diameter to receive slidingly therethrough said lateral flow pipe; a floor between said side walls having a central, outwardly bowed trough across and in which said lateral pipe is seated, said floor sloping from each side of said trough inwardly and oppositely therefrom to merge into the wall of said primary pipe; said trough being located to carry said lateral pipe to have its longitudinal axis at least as far from the primary pipe axis as the inside face of the wall of the primary pipe; and said lateral pipe having its side portion between said side walls cut away from edge to edge of said trough to provide an opening into that lateral pipe from said bay.

2. A primary flow pipe bulged outwardly on one side to provide a bay internally thereof substantially fully offset from the bore of the pipe; a lateral flow pipe carried through the pipe bulge across the outermost portion of its inner face, transversely of the primary pipe, and opening from its side into said bay, the longitudinal length of the bay exceeding the diameter of said lateral pipe.

3. A primary flow pipe bulged outwardly on one side to provide a bay internally thereof substantially fully offset from the bore of the pipe; a lateral flow pipe carried through the pipe bulge across the outermost portion of its inner face, transversely of the primary pipe, and opening from its side into said bay, the longitudinal length of the bay exceeding the diameter of said lateral pipe; said pipe bulged portion having a trough thereacross in said face receiving therein that circumferential portion of said lateral pipe extending from edge to edge of said opening thereof.

4. The combination of a primary flow pipe; an outwardly extending bulge on the pipe defined by side walls and an interconnecting floor to form a bay internally of and offset from the bore of the pipe; a secondary pipe extending through said side walls and internally across said floor, said secondary pipe having an opening therefrom between said walls throughout substantially half its circumference; and said floor sloping from opposite side edges of said opening to merge into the wall of said primary pipe; whereby fluid within the primary pipe may first enter an enlarged portion of that pipe as defined by said bay, and from that bay flow into said secondary pipe.

5. The combination of a primary flow pipe; an outwardly extending bulge on the pipe defined by side walls and an interconnecting floor to form a bay internally of and offset from the bore of the pipe; a secondary pipe extending through said side walls and internally across said floor, said secondary pipe having an opening therefrom between said walls throughout substantially half its circumference; and said floor sloping from opposite side edges of said opening to merge into the wall of said primary pipe; whereby fluid within the primary pipe may first enter an enlarged portion of that pipe as defined by said bay, and from that bay flow into said secondary pipe; said floor having a depression thereacross receiving therein the side of said secondary pipe opposite its said opening.

6. The combination of a primary flow pipe; an outwardly extending bulge on the pipe defined by side walls and an interconnecting floor to form a bay internally of and offset from the bore of the pipe; a secondary pipe extending through said side walls and internally across said floor, said secondary pipe having an opening therefrom between said walls throughout substantially half its circumference; and said floor sloping from opposite side edges of said opening to merge into the wall of said primary pipe; whereby fluid within the primary pipe may first enter an enlarged portion of that pipe as defined by said bay, and from that bay flow into said secondary pipe; said bay being substantially rectangular in cross-section at right angles to the axis of said primary pipe.

7. The combination of a primary flow pipe; an outwardly extending bulge on the pipe defined by side walls and an interconnecting floor to form a bay internally of and offset from the bore of the pipe; a secondary pipe extending through said side walls and internally across said floor, said secondary pipe having an opening therefrom between said walls throughout substantially half its circumference; and said floor sloping from opposite side edges of said opening to merge into the wall of said primary pipe; whereby fluid within the primary pipe may first enter an enlarged portion of that pipe as defined by said bay, and from that bay flow into said secondary pipe; said floor having a depression thereacross receiving therein the side of said secondary pipe opposite its said opening; and said floor being arcuate in form centrally interrupted by said depression.

JOSEPH L. BRADFIELD.

REFERENCES CITED

The following references are of record in the file of this patent:

UNITED STATES PATENTS

| Number | Name | Date |
|---|---|---|
| 598,321 | Kruse | Feb. 1, 1898 |
| 2,338,090 | Bradfield | Jan. 4, 1944 |